United States Patent [19]

Suzuki et al.

[11] Patent Number: 5,587,739
[45] Date of Patent: Dec. 24, 1996

[54] VARIABLE MAGNIFICATION IMAGE TAKING DEVICE

[75] Inventors: Takeshi Suzuki, Ebina; Atushi Sekine, Kasukabe, both of Japan

[73] Assignee: Nikon Corporation, Tokyo, Japan

[21] Appl. No.: 443,897

[22] Filed: May 17, 1995

Related U.S. Application Data

[63] Continuation of Ser. No. 217,842, Mar. 25, 1994, abandoned.

[30] Foreign Application Priority Data

| Mar. 26, 1993 | [JP] | Japan | 5-090533 |
| May 31, 1993 | [JP] | Japan | 5-149728 |
| Dec. 22, 1993 | [JP] | Japan | 5-345620 |

[51] Int. Cl.$^6$ .................................................. H04N 5/232
[52] U.S. Cl. ...................... 348/347; 348/374; 348/208; 359/698
[58] Field of Search ................................. 348/347, 351, 348/345, 374, 208; 359/648, 698; H04N 5/232

[56] References Cited

U.S. PATENT DOCUMENTS

| 4,842,387 | 6/1989 | Murakami et al. | 348/351 |
| 4,950,054 | 8/1990 | Wada et al. | 348/347 |
| 4,991,022 | 2/1991 | Canfield et al. | 348/581 |
| 4,994,842 | 2/1991 | Itoh et al. | 348/347 |
| 5,071,237 | 12/1991 | Braat et al. | 359/686 |
| 5,113,214 | 5/1992 | Nagata et al. | 348/347 |
| 5,157,732 | 10/1992 | Ishii et al. | 348/208 |
| 5,253,071 | 10/1993 | MacKay | 348/208 |

*Primary Examiner*—Michael Horabik
*Assistant Examiner*—Michael Day
*Attorney, Agent, or Firm*—Shapiro and Shapiro

[57] ABSTRACT

A variable-magnification image taking device comprising a phototaking lens for varying magnification, a solid-state image pickup device for receiving an object image formed by the phototaking lens and recording the image information of the object image, a moving device for axially moving the solid-state image pickup device, and a control device for controlling the moving device so as to position the solid-state image pickup device at the focus position of the object image, movable according to the magnification-varying operation of the phototaking lens.

9 Claims, 5 Drawing Sheets

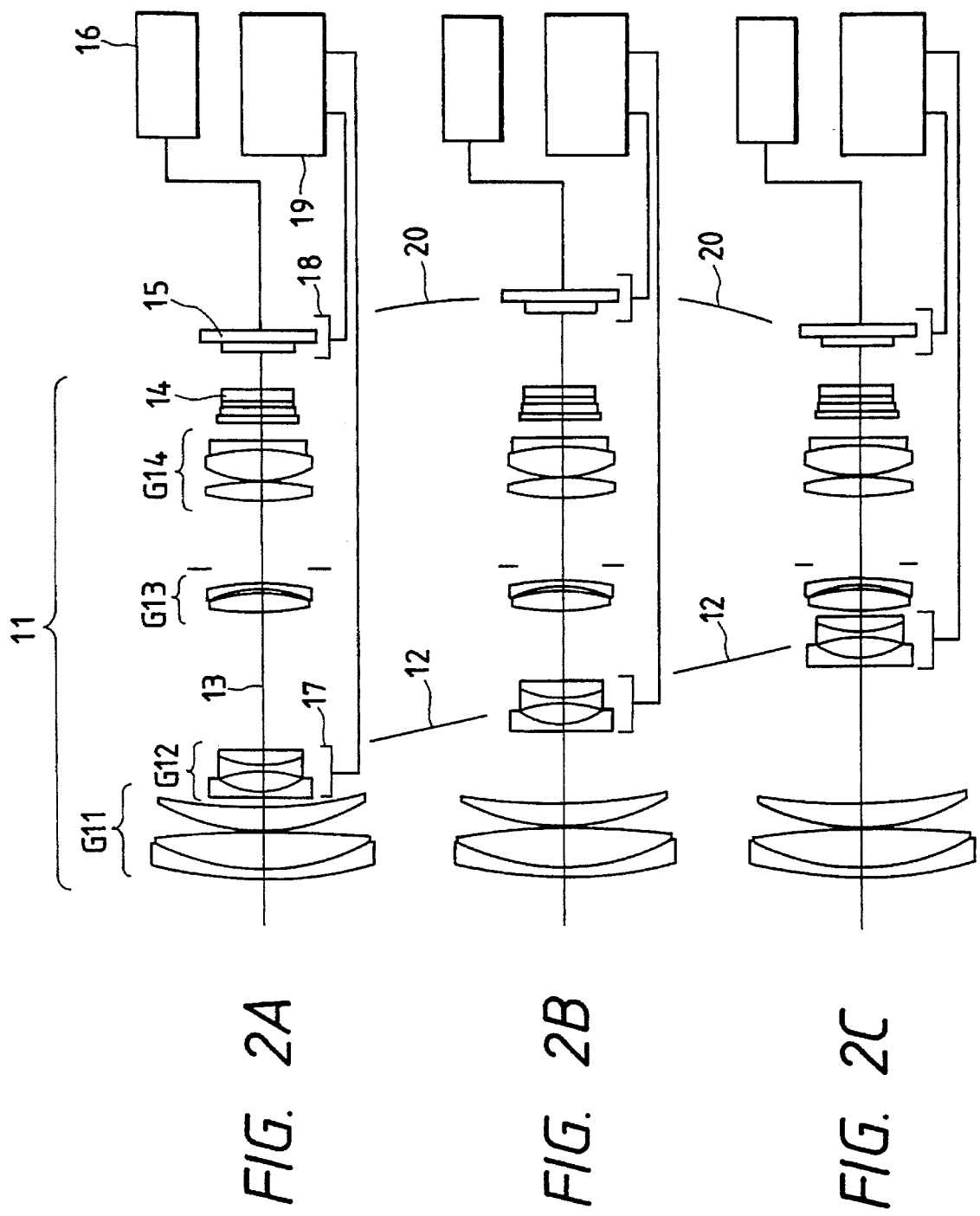

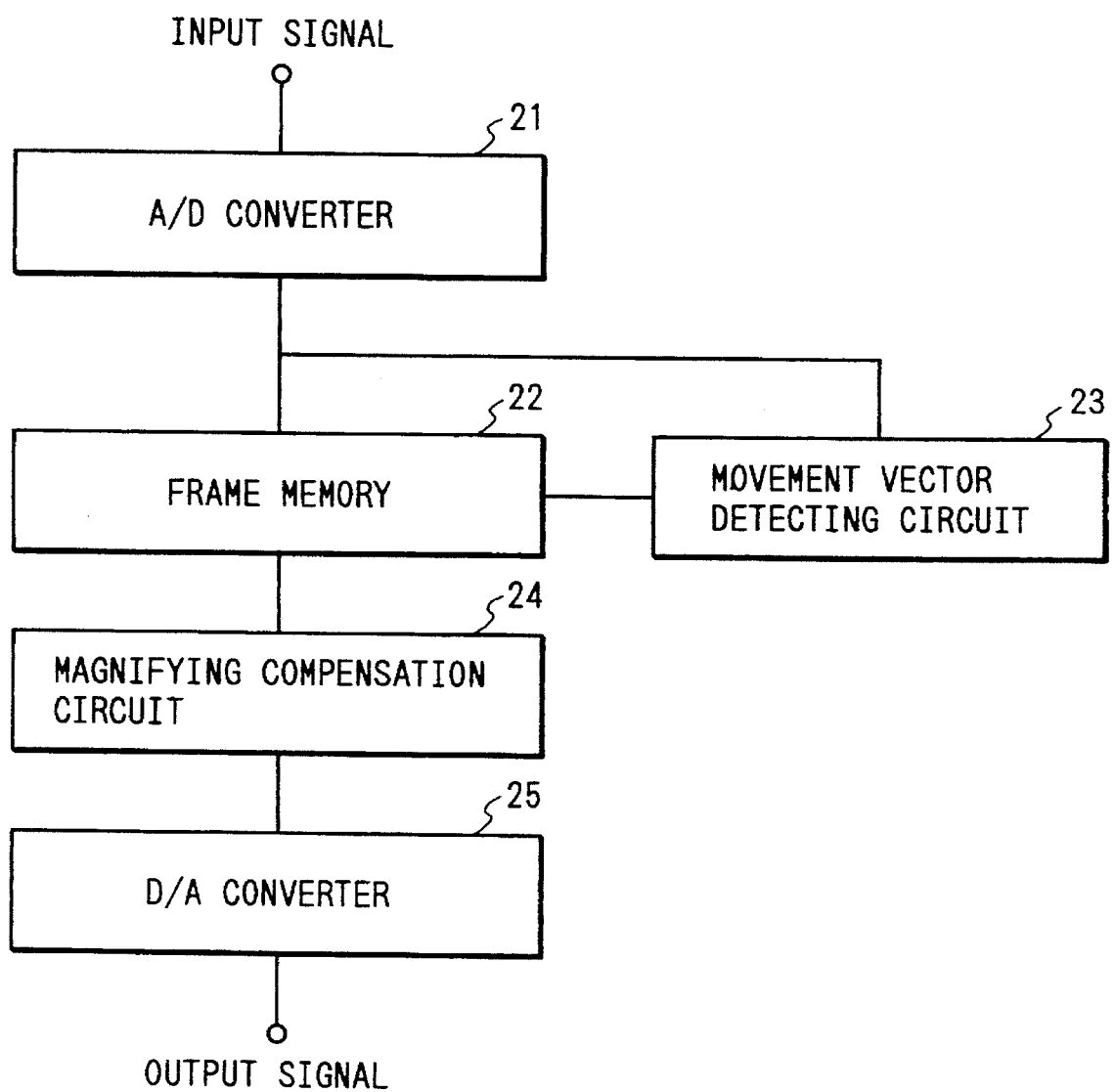

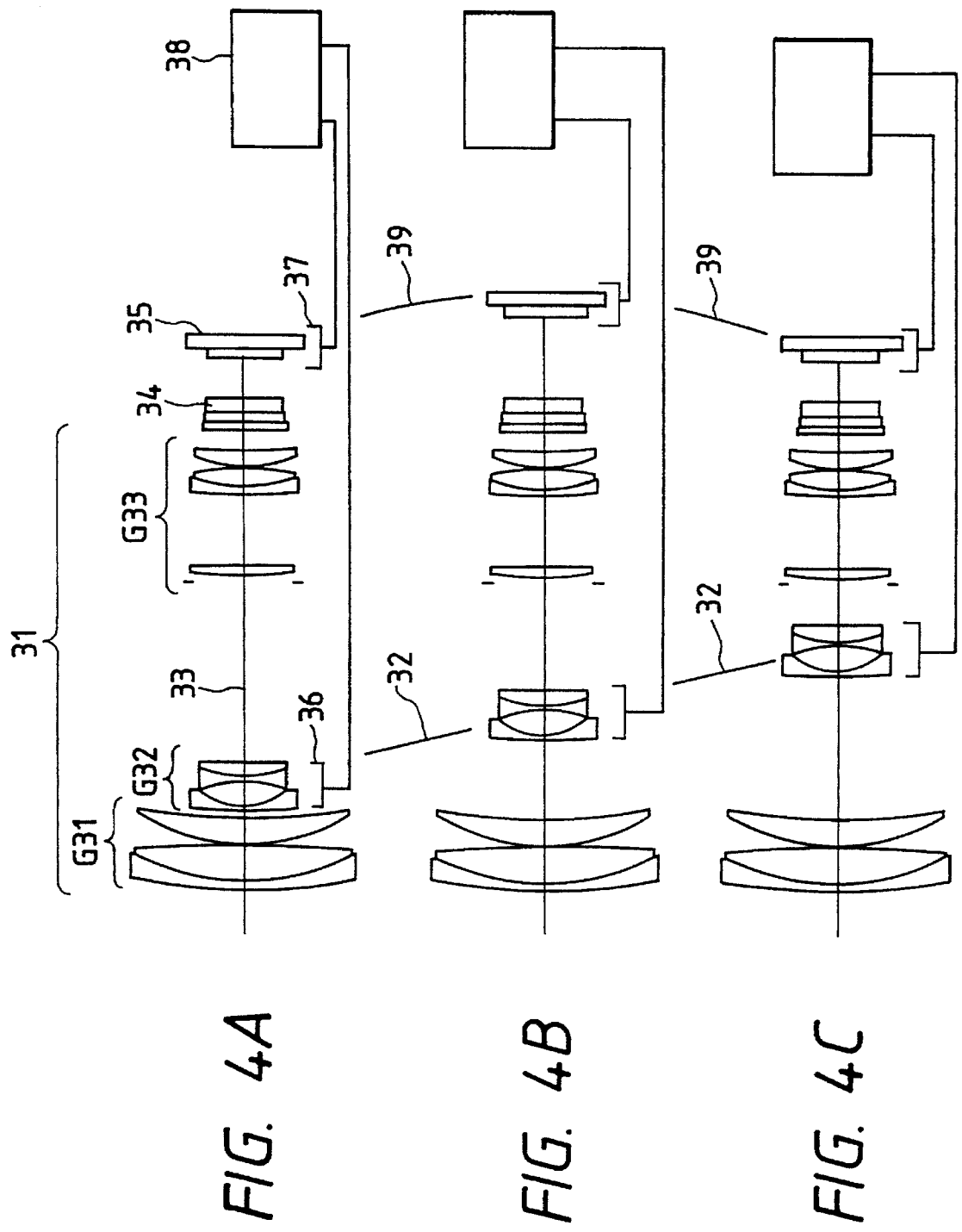

VARIABLE MAGNIFICATION IMAGE TAKING DEVICE

This is a continuation of application Ser. No. 08/217,842 filed Mar. 25, 1994, now abandoned.

BACKGROUND OF THE INVENTION

1. Field of the Invention

The present invention relates to a variable-magnification image taking device adapted for use in a video camera, a television camera or the like.

2. Related Background Art

In the conventional variable-magnification image taking device, the variation in image magnification is generally achieved by a change in the image angle, by a suitable movement of at least a movable magnification-varying lens group in plural lens groups constituting the phototaking (zoom) lens. In such case, a simple movement of a part of the lens groups results in a movement of the focus position of the object image. In order to compensate such movement in the position of the object image, there is provided a correcting lens group in the phototaking lens, and this correcting lens group is moved by a specified distance so as to maintain the focus position constant.

Therefore, in the conventional variable-magnification image taking device, there are required at least two movable lens groups, namely a movable magnification-varying lens group for zooming operation and a correcting lens group for correcting the focus position. Consequently the configuration of the device becomes inevitably complex, and spaces for the movement of movable lens groups have to be secured therein.

More specifically, in a first example of the zoom lens consisting, in the order from the object side, of a 1st lens group of a positive refractive power, a 2nd lens group of a negative refractive power, a 3rd lens group of a negative refractive power and a 4th lens group of a positive refractive power, in which the 2nd lens group constitutes the movable magnification-varying lens group and the 3rd lens group. constitutes the correcting lens group, said correcting lens group is positioned between the movable magnification-varying lens group and a diaphragm, and the moving space of the correcting lens group, required for the correction of focus position, has to be secured within the zoom lens. As a result, there is required a large distance between the 1st lens group and the diaphragm, and the diameter of the 1st lens group has accordingly to be made large.

Also in a second example of the zoom lens consisting, in order from the object side, of a 1st lens group of a positive refractive power, a 2nd lens group of a negative refractive power, a 3rd lens group of a positive refractive power and a 4th lens group of a positive refractive power, in which the 2nd lens group constitutes the movable magnification-varying lens group and the 3rd lens group constitutes the correcting lens group, the corrective movement thereof is done along a trajectory concave to the object side when the light beam emerging therefrom becomes nearly parallel.

Such corrective movement hinders the zooming operation from the wide-angle position to the middle position. For this reason, there is required a large amount of movement of the 2nd lens group, in order to obtain a predetermined focal length. As a result, there is required a large gap between the 1st and 2nd lens groups, and the diameter of the 1st lens group becomes inevitably large.

Also in a third example of the zoom lens consisting, in the order from the object side, of a 1st lens group of a positive refractive power, a 2nd lens group of a negative refractive power, a 3rd lens group of a positive refractive power and a 4th lens group of a positive refractive power, in which the 2nd lens group constitutes the movable magnification-varying lens group and the 4th lens group constitutes the correcting lens group, the focus point is displaced if an auxiliary equipment such as extender is inserted between the 3rd and 4th lens groups. Stated differently, the focus position varies depending on the insertion of an auxiliary equipment such as extender.

Finally, in a fourth example of the zoom lens consisting, in the order from the object side, of a 1st lens group of a negative refractive power, and a 2nd lens group of a positive refractive power, in which the 2nd lens group constitutes the movable magnification-varying lens group and the 1st lens group constitutes the correcting lens group, the latter tends to become large and heavy, particularly in case of a wide-angle zoom lens. For this reason, the moving mechanism for the correcting lens group has to bear a heavy load.

In recent years, there is an increasing demand for a zoom lens which has a large aperture and a wide image angle, and is of a compact size, a light weight and a high performance, combined with a large zooming ratio. Compactization and reduction in weight of a zoom lens, or a higher performance thereof with same size and weight, can generally be achieved by a decrease in number of the constituting lenses or by an increase in the refractive power of each lens group. As a result, the corrections of various aberrations have to be sacrificed, and the imaging performance becomes inevitably lower.

SUMMARY OF THE INVENTION

A first of the present invention is to resolve the difficulties in the optical and mechanical designing in the conventional variable-magnification image taking device as explained above, resulting from the presence of the correcting lens group, and to provide a variable-magnification image taking device which is simple in mechanical configuration and excellent in performance.

A second object of the present invention is to provide a variable-magnification image taking device of high performance, capable of dispensing with the conventional compensator lens (i.e., the movable correcting lens) by driving a solid-state image pickup device to compensate the displacement of the image point due to zooming, thereby significantly relaxing the limitations in designing, and also capable of providing an image without vibration by a vibration compensating mechanism.

A third object of the present invention is to provide a compact variable-magnification image taking device of high performance, which is simplified in configuration, by dispensing with the conventional compensator lens (i.e., the movable correcting lens) by driving the solid-state image pickup device to compensate the displacement of the image point due zooming.

BRIEF DESCRIPTION OF THE DRAWINGS

FIGS. 2A, 2B and 2C are schematic views of a second embodiment of the variable-magnification image taking device of the present invention, respectively in a wide angle position, a middle position and a telephoto position;

FIG. 3 is a schematic view showing the configuration of a vibration compensating circuit;

FIGS. 4A, 4B and 4C are schematic views of a third embodiment of the variable-magnification image taking device of the present invention, respectively in a wide angle position, a middle position and a telephoto position;

DESCRIPTION OF THE PREFERRED EMBODIMENTS

Figures 1A, 1B, 1C:
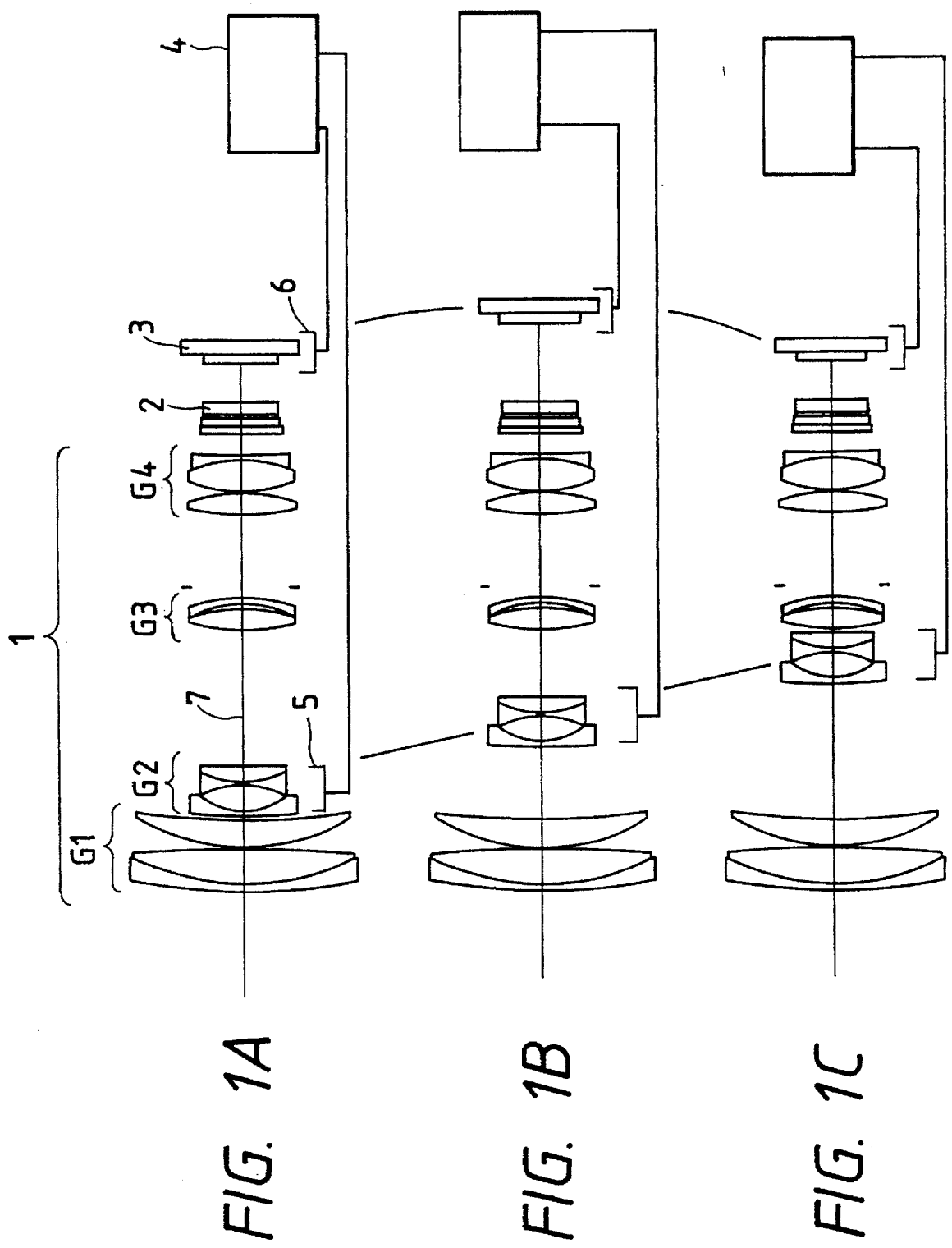
FIGS. 1A, 1B and 1C are schematic views of an embodiment of the variable-magnification image taking device of the present invention, respectively in a wide angle position, a middle position and a telephoto position.

The above-mentioned first object can be attained, according to the present invention, by a variable-magnification image taking device provided with lens groups including at least a lens group for varying magnification, and a solid-state image pickup device provided at the focus position of the object image formed by said lens groups, comprising movement means for axially moving said solid-state image pickup device and control means for regulating the amount of actuation by said movement means, so as to follow the focus position of said object image, movable according to the magnification-varying operation of said lens group.

In another embodiment, the solid-state image pickup device in the above-mentioned variable-magnification image taking device is composed of an area image sensor.

In the above-mentioned configuration of the present invention, the control means calculates the focus position of the object image moved by the magnification-varying operation, and, based on the result of said calculation, the movement means displaces the solid-state image pickup device to effect correction in such a manner that the image receiving position thereof coincides with said focus position of the object image.

Thus, the magnification-varying operation is achieved by a variation of the image angle of the phototaking lens, caused by the movement of the movable lens group, and the focus position of the object image also moves by such variation in the image angle of the photo-taking lens. The above-mentioned control means detects, for example, the amount of movement of the movable lens group and calculates the amount of movement of the solid-state image pickup device, based on an equation representing the relationship between the amount of movement of the movable lens group and said amount of movement of the solid-state image pickup device required for compensating the aberration in the focus position, resulting from the magnification-varying operation.

Also, instead of such calculation, the control means may be given a table defining the relationship between the amount of movement of said movable lens group and that of said solid-state image pickup device, and said table may be used for deriving the amount of movement of said solid-state image pickup device from that of said movable lens group.

The above-mentioned movement means moves the image receiving position of said solid-state image pickup device to the focus position of the object image, according to the result of such calculation.

In the present invention, the means for moving the lens group, to be fitted in the variable-magnification image taking device and said movement means for moving the solid-state image pickup device may rely on mechanical coupling such as by cam ring or an electrical coupling. Stated differently, there may be employed any means making it possible to detect the amount of movement of the movable lens group and to move the image receiving position of the solid-state image pickup device to a position corresponding to said amount of movement.

In the above-explained embodiments, in the axial movement of the solid-state image pickup device, said device may generate vibration transverse to the optical axis, and such vibration causes the image, taken by the solid-state image pickup device, to vibrate transverse to the optical axis.

The above-mentioned second object can be attained, according to the present invention, by a variable-magnification image taking device comprising a lens group for effecting a magnification-varying operation; a solid-state image pickup device for receiving the object image formed by said lens group and storing the image information of said object image; movement means for axially moving said solid-state image pickup device; control means for controlling said movement means in such a manner that said solid-state image pickup device follows the focus position of the object image, movable according to the magnification-varying operation of said lens group; and compensation means for compensating the vibration of the received image resulting from the movement of said solid-state image pickup device.

In a preferred embodiment of the present invention, said compensation means is composed of an A/D converter for converting analog signal, released from the solid-state image pickup device, into a digital signal; a movement vector detection circuit for receiving the output of said A/D converter and detecting the movement vector of vibration of the received image; a frame memory for receiving the output of said A/D converter thereby storing the received image, and selecting and releasing the image of a desired position, within said received image, based on the amount of vibration detected by said movement vector detection circuit; an expanding correction circuit for expanding the image, released from said frame memory, into the image of a predetermined size; and a D/A converter for converting the digital signal, released from said expanding correction circuit, into an analog signal.

In the variable-magnification image taking device, the variation in magnification is generally achieved by a change in the image angle of the phototaking lens, through the movement of the movable magnification-varying lens group. At the same time, the focus position of the object image also varies according to the change in the image angle, but there stands a certain relationship, specific to the optical system, between the amount of movement of the movable magnification-varying lens group and that of the focus position of the object image.

In the variable-magnification image taking device of the present invention, as explained in the foregoing, the control means suitably controls the movement means for the solid-state image pickup device, thereby causing the solid-state image pickup device to follow the focus position of the object image, movable according to the magnification-varying operation of the lens group. More specifically, there is detected, for example, the amount of movement of the movable magnification-varying lens group to be moved at the zooming operation, and, based on thus detected amount of movement, there is determined the amount of movement of the focus position or the amount of movement required for the solid-state image pickup device.

The amount of movement required for the solid-state image pickup device may be determined from the detected amount of movement of the movable magnification-varying lens group through a calculation based on the aforementioned relationship, or directly from said detected amount of movement, based on the table defining said relationship.

Also the moving means for moving the movable magnification-varying lens groups and the movement means for moving the solid-state image pickup device may be mechanically coupled for example through a cam ring, or both may be coupled electrically. Furthermore, instead of calculating the focus position, it is also possible to move the solid-state image pickup device to the focus position through combination with an auto focusing device.

The variable-magnification image taking device of the present invention is further provided with compensation means, consisting of vibration amount detecting means for detecting the amount of vibration of the received image and vibration amount compensating means for compensating the vibration of the received image, based on the detected amount of vibration, thereby compensating the vibration of the image, resulting from the movement of the solid-state image pickup device. More specifically, the movement vector of vibration of the received image is detected, then, based on the detected amount of vibration, the image of a desired position is selected within the received image, and the selected image is expanded to the image frame of predetermined size.

In this manner, the variable-magnification image taking device of the present invention can resolve the image vibration associated with the movement of the solid-state image pickup device, by compensation of vibration through the detection of movement vector of the image. The above-mentioned vibration compensating mechanism may also be utilized to resolve the image vibration associated with the movement of the entire camera.

The above-mentioned third object can be attained, according to the present invention, by a variable-magnification image taking device having a phototaking lens for varying magnification and a solid-state image pickup device for receiving the object image formed by said phototaking lens and storing the image information of said object image, comprising movement means for axially moving said solid-state image pickup device; control means for controlling said movement means in such a manner that said solid-state image pickup device follows the focus position of the object image, movable according to the magnification-varying operation of said phototaking lens; and compensation means for compensating the vibration of the received image resulting from the movement of said solid-state image pickup device, wherein said phototaking lens is provided, in the order from the object side, with a 1st lens group G1 of a positive refractive power, a 2nd lens group G2 of a negative refractive power and a 3rd lens group G3 of a positive refractive power, and at least one of said 1st to 3rd lens groups move axially at the variation of magnification from the wide angle end to the telephoto end.

In a preferred embodiment of the present invention, at the magnification-varying operation from the wide angle end to the telephoto end, said 2nd lens group G2 moves toward said solid-state image pickup device while said 1st and 3rd lens groups G1, G3 remain fixed during said operation. It is furthermore preferable that at least one of the lenses constituting said 2nd lens group G2 has an Abbe's number for the d-line larger than 40, and that at least one of the lens faces of said 3rd lens group G3 is aspherical.

In the variable-magnification image taking device, the variation in magnification is generally achieved by a change in the image angle of the phototaking lens, through the movement of the movable magnification-varying lens group. At the same time, the focus position of the object image also varies according to the change in the image angle, but there stands a certain relationship, specific to the optical system, between the amount of movement of the movable magnification-varying lens group and that of the focus position of the object image.

In the variable-magnification image taking device of the present invention, as explained in the foregoing, the control means suitably controls the movement means for the solid-state image pickup device, thereby causing the solid-state image pickup device to follow the focus position of the object image, movable according to the magnification-varying operation of the lens group. More specifically, there is detected, for example, the amount of movement of the movable magnification-varying lens group to be moved at the zooming operation, and, based on thus detected amount of movement, there is determined the amount of movement of the focus position or the amount of movement required for the solid-state image pickup device.

The amount of movement required for the solid-state image pickup device may be determined from the detected amount of movement of the movable magnification-varying lens group through a calculation based on the aforementioned relationship, or directly from said detected amount of movement, based on the table defining said relationship.

Also the moving means for moving the movable magnification-varying lens group and the movement means for moving the solid-state image pickup device may be mechanically coupled for example through a cam ring, or both may be coupled electrically. Furthermore, instead of calculating the focus position, it is also possible to move the solid-state image pickup device to the focus position through combination with an auto focusing device.

The variable-magnification image taking device of the present invention is further provided with compensation means, consisting of vibration amount detecting means for detecting the amount of vibration of the received image and vibration amount compensating means for compensating the vibration of the received image, based on the detected amount of vibration, thereby compensating the vibration of the image, resulting from the movement of the solid-state image pickup device. More specifically, the movement vector of vibration of the received image is detected, then, based on the detected amount of vibration, the image of a desired position is selected within the received image, and the selected image is expanded to the image frame of predetermined size.

In this manner, the variable-magnification image taking device of the present invention can resolve the image vibration associated with the movement of the solid-state image pickup device, by compensation of vibration through the detection of movement vector of the image. The above-mentioned vibration compensating mechanism may also be utilized to resolve the image vibration associated with the movement of the entire camera.

For achieving satisfactory imaging performance in the zoom lens while attaining a larger aperture, a wider image angle, a smaller size and a lighter weight, the phototaking lens according to the present invention is composed, in the order from the object side, of a 1st lens group of a positive refractive power, a 2nd lens group of a negative refractive power and a 3rd lens group of a positive refractive power, in which at least one of said 1st to 3rd lens groups move axially at the variation of magnification from the wide angle position to the telephoto position.

It is preferable that, at the variation of magnification from the wide angle position to the telephoto position, the 2nd lens group moves toward the solid-state image pickup device while the 1st and 3rd lens groups remain fixed during said operation.

Also in the present invention, in order to attain high performance, compactness and reduction in weight, required for the zoom lens for use in the television camera, the aspherical face is preferably employed in at least one of the lens faces. It is thus rendered possible to suppress the aberrations of higher order while reducing the number of constituting lens elements. For such purpose it is more preferable to introduce such aspherical face in the 3rd lens group.

Furthermore, same effect as achieved by such aspherical face may also be attained by a refractive index-distributed lens or a plastic lens.

For realizing further improved imaging performance, at least a lens in those constituting the 2nd lens group preferably has an Abbe's number $v_d$, for the d-line ($\lambda$=587.6 nm), satisfying the following condition (1):

$$v_d > 40 \qquad (1)$$

The Abbe's number can be represented by the following equation (2):

$$v_d = (n_d - 1)/(n_F - n_C) \qquad (2)$$

wherein $n_d$: refractive index for d-line;
$n_F$: refractive index for F-line ($\lambda$=486.1 nm);
$n_C$: refractive index for C-line ($\lambda$=656.3 nm).

Below the lower limit of the condition (1), the variation of the magnification color aberration in the magnification-varying operation becomes undesirably large.

DESCRIPTION OF THE PREFERRED EMBODIMENTS

In the following there will be explained an embodiment of the present invention, with reference to the attached drawings.

FIGS. 1A, 1B and 1C are schematic views of an embodiment of the variable-magnification image taking device of the present invention.

A phototaking lens 1 is composed of a 1st lens group G1, a 2nd lens group (movable magnification-varying lens group) G2, a 3rd lens group G3 and a 4th lens group (focusing lens group) G4.

A low-pass filter 2 is an already known filter, for example for intercepting the infrared light.

A solid-state image pickup device 3 is composed of an image receiving unit for receiving the object image, and a storage unit for storing the image information.

A moving device 5, for moving the movable magnification-varying lens G2, supplies the control unit 4 with an amount of movement associated with the magnification-varying operation of said movable lens group G2.

The control unit 4 effects a calculation based on the amount of movement transmitted from the moving device 5 for moving the movable lens group G2, thus determining the position to which the solid-state image pickup device 3 is to be moved corresponding to the amount of movement of the movable lens group G2, and supplies a moving device 6 for the solid-state image pickup device with the result of calculation. Based on thus supplied information, the moving device 6 moves the solid-state image pickup device 3.

FIG. 1A is a schematic view showing a state in the wide angle position, in which the movable magnification-varying lens group G2 comes infinitesimally close to the 1st lens group G1 along the optical axis 7, whereby the image angle becomes largest.

Also FIG. 1B is a schematic view showing a state in the middle position, in which the movable magnification-varying lens group G2 is present, along the optical axis 7, at the middle of the 1st and 3rd lens groups G1, G3.

FIG. 1C is a schematic view showing a state in the telephoto position, in which the movable magnification-varying lens group G2 comes infinitesimally close to the 3rd lens group G3 along the optical axis 7, whereby the image angle becomes minimum.

The image taking device of the present invention is usable, not only for compensating the movement of the image plane resulting from the variation in the image angle but also compensating the movement in the focus point at the focusing operation. In the latter case the load to the driving unit is very small and a prompt focusing operation is possible, because the solid-state image pickup device to be moved is light and small. It is also possible to move the solid-state image pickup device and to displace the focus correcting lens groups so as to focus on said device.

It is naturally possible also, instead of calculating the focus position, to utilize an auto focusing device, thereby moving the solid-state image pickup device to the focus position.

As explained in the foregoing, the variable-magnification image taking device of the present invention, capable of effecting compensation by moving the image receiving part of the solid-state image pickup device so as to follow the moving focus position of the object image, can dispense with the conventional compensator lens (i.e. the movable correcting lens); which has been utilized for compensating the movement of the object image resulting from the variation in the image angle, thereby eliminating various drawbacks associated with the presence of the compensator lens and achieving high performance with a simple lens configuration.

For example, the variable-magnification image taking device of the present invention, being free from the conventionally existing movable correcting lens, by driving the solid-state image pickup device to the focus position instead of driving the conventional movable correcting lens to compensate the displacement of the image point due to zooming, is reduced in the number of lens elements for correcting aberrations, thereby being securely capable of compactization of the phototaking lens and accordingly simplication of the driving mechanisms.

Besides, since the light and small solid-state image pickup device is moved instead of the conventional large lens group, the driving unit is reduced in load and can therefore be simplified.

FIGS. 2A, 2B and 2C are schematic views of a second embodiment of the variable-magnification image taking device of the present invention, respectively in the wide angle position, middle position and telephoto position.

In these drawings, the phototaking lens 11 is composed, in the order from the object side, of a 1st lens group G11, consisting of an adhered lens, composed of a negative meniscus lens convex to the object side and a biconvex positive lens, and a positive meniscus lens convex to the object side; a 2nd lens group G12 consisting of an adhered lens composed of a negative meniscus lens convex to the object side, a positive biconvex lens, a negative biconcave lens and a positive meniscus lens convex to the object side; a 3rd lens group G13 consisting of a positive biconvex lens and a negative meniscus lens concave to the object side; and a 4th lens group G14 consisting of a biconvex lens and an adhered lens composed of a biconvex lens and a negative meniscus lens concave to the object side.

The 2nd lens group G12 constitutes a movable magnification-varying (zooming) lens group, moving axially along a zooming trajectory 12 between a wide angle position and a telephoto position. The 3rd lens group G13 is fixed, and the 4th lens group G14 constitutes a focusing lens group.

On the optical axis 13, opposite to the object side with respect to the 4th lens group G14, there is provided a low-pass filter 14, which is technically already known, for example for intercepting the infrared light. On the optical axis 13, opposite to the object side with respect to the low-pass filter 14, and at the focus position of the object image, there is provided a solid-state image pickup device 15, such as an area sensor, composed of an image receiving part for receiving the object image and a storage part for storing the received image information. The output of the solid-state image pickup device 15 is supplied to a vibration compensation circuit 16 to be explained later.

The illustrated device is also provided with a moving device 17 for moving the 2nd lens group G12 along the optical axis 13, and a moving device 18 for moving the solid-state image pickup device 15 along the optical axis 13. The moving device 17 is provided with a sensor for detecting the amount of movement of the movable magnification-varying lens group G12, and the detected amount of movement is supplied to a control unit 19.

Based on the amount of movement of the movable magnification-varying lens group G12 in the magnification-varying operation, detected by the moving device 17, the control unit 19 calculates the focus position of the object image, namely the position where the image receiving part of the solid-state image pickup device 15 is to be moved, and sends the calculated position information to the moving device 18, which, in response, moves the solid-state image pickup device 15 to the focus position of the object image. The operations from the detection of the amount of movement of the lens group G12 to the movement of the solid-state image pickup device 15 are executed on real-time basis.

In the wide angle position (see FIG. 2A), the movable magnification-varying lens groups G12 is infinitesimally close, along the optical axis 13, to the 1st lens group G11, whereby the image angle becomes maximum.

In the course from the wide-angle position to the middle position (see FIG. 2B), the movable lens group G12 moves along the zooming trajectory 12, and, in said middle position, the movable lens group G12 is positioned in the middle of the 1st and 3rd lens groups G11, G13. On the other hand, in the course from the wide angle position to the middle position, the solid-state image pickup device 15 moves away from the object side, along a trajectory 20 which is concave to the object side.

In the course from the middle position to the telephoto position (see FIG. 2C), the movable lens group G12 moves further along the zooming trajectory 12, and, in the telephoto position, the movable lens group G12 is infinitesimally close, along the optical axis 13, to the 3rd lens group G13, whereby the image angle becomes minimum. On the other hand, in the course from the middle position to the telephoto position, the solid-state image pickup device 15 moves closer to the object side along the trajector 20 concave to the object side.

As explained in the foregoing, the present invention enables the solid-state image pickup device 15 to follow (along the trajectory 20) the focus position of the object image, movable by the movement of the movable magnification-varying lens group G12 along the zooming trajectory 12. Such focus position following mechanism for the solid-state image pickup device may be utilized, not only in compensation of the image plane movement resulting from the image angle variation in the image taking device but also in compensation of the focus position movement in the focusing operation. In either case, the load to the driving device is very small and a prompt focusing operation is made possible, since the solid-state image pickup device to be moved is light and small.

In case the focusing operation becomes too long because of the excessively large amount of movement required for the solid-state image pickup device, it is also possible to move the solid-state image pickup device by a predetermined amount and to move the focus correcting lens group in such a manner that the focus position coincides with the position of the image pickup device. Stated differently, the focus position following mechanism of the present invention for the solid-state image pickup device may be combined with the correction of image position by the movement of the focus point correcting lens group.

FIG. 3 is a schematic view of the vibration compensation circuit shown in FIGS. 2A to 2C. Said circuit 16 compensates the transverse vibration of the received image with respect to the optical axis 13, generated by the transverse vibration of the solid-state image pickup device 15 with respect to the optical axis 13.

The vibration compensation circuit 16 is provided with an A/D converter 21 for converting the analog signal, released from the solid-state image pickup device 15, into a digital signal, which is supplied to a frame memory 22 and a movement vector detecting circuit 23, for detecting the movement vector of the received image.

The frame memory 22, receiving the output of the A/D converter 21, stores the received image and releases the image of a desired position, within the stored received image, based on the amount of vibration detected by the movement vector detecting circuit 23. Stated differently, the readout position of the frame memory 22 is controlled according to the vibration information detected by the movement vector detecting circuit 23.

The output of the frame memory 22 is supplied to a magnifying compensation circuit 24, which expands the image, selected by the frame memory 22, into the predetermined original size. The output of the magnifying compensation circuit 24 is supplied to a D/A converter 25, which converts the digital signal into an analog signal, thereby providing an output signal without image vibration.

The present embodiment has been explained by a configuration employing a phototaking lens consisting of four lens groups, but the present invention is naturally effective to any other configuration employing a phototaking lens including at least a movable magnification-varying lens group.

As explained in the foregoing, the present invention is provided with the focus position following mechanism for the solid-state image pickup device and the image vibration compensation mechanism. Consequently the movable correcting lens as a compensator can be dispensed with, and the limitation in designing can be significantly alleviated. It is rendered possible to realize a simplified lens mechanism and to provide a variable-magnification image taking device of high performance, without image vibration.

Also since the variation in magnification can be achieved by the movement of light and small solid-state image pickup device, the load to the driving device can be reduced and a prompt focusing operation is rendered possible.

Furthermore, as the movable correcting lens can be dispensed with, the number of lens elements required for correction of aberrations can be reduced, and the entire phototaking lens can be compactized.

FIGS. 4A, 4B and 4C are schematic views of a third embodiment of the variable-magnification image taking device of the present invention, respectively in the wide angle position, middle position and telephoto position.

In these drawings, the phototaking lens 31 is provided, in the order from the object side, with a 1st lens group G31 of a positive refractive power, a 2nd lens group G32 of a negative refractive power, and a 3rd lens group G33 of a positive refractive power. The details of the constituent lenses will be explained in the following numerical examples.

The 2nd lens group G32 constitutes a movable magnification-varying lens group, and moves on the optical axis 33, between the wide angle position and the telephoto position, along a zooming trajectory 32. In the 3rd lens group G33, a front lens group constitutes a fixed lens group, while a rear lens group constitutes a focusing lens group.

On the optical axis 33, opposite to the object side with respect to the 3rd lens group G33, there is provided a low-pass filter 34, which is technically already known, for example for intercepting the infrared light. On the optical axis 33, opposite to the object side with respect to the low-pass filter 34 and at the focus position of the object image, there is provided a solid-state image pickup device 35, such as an area sensor. The solid-state image pickup device 35 is composed of an image receiving part for receiving the object image and a memory part for storing the received image information.

The illustrated device is further provided with a moving device 36 for moving the 2nd lens group G32 along the optical axis 33, and a moving device 37 for moving the solid-state image pickup device 35 along the optical axis 33. The moving device 36 is provided with a sensor for detecting the amount of movement of the movable magnification-varying lens group G32, and the detected amount of movement is supplied to a control unit 38.

Based on the amount of movement of the movable magnification-varying lens group G32, detected by the moving device 36, the control unit 38 calculates the focus position of the object image, namely the position where the image receiving part of the solid-state image pickup device 35 is to be moved, and sends the calculated position information to the driving device 37, which in response moves the solid-state image pickup device 35 to the focus position of the object image. The operations from the detection of the amount of movement of the movable magnification-varying lens group G32 to the movement of the solid-state image pickup device 35 are executed on real-time basis.

In the wide angle position (see FIG. 4A), the movable magnification-varying lens group G32 is infinitely close, on the optical axis 33, to the 1st lens group G31, whereby the image angle becomes maximum.

In the course from the wide angle position to the middle position (see FIG. 4B), the movable magnification-varying lens group G32 moves along the zooming trajectory 32, and, in the middle position, the movable lens group G32 is positioned at the middle of the 1st and 3rd lens groups G31, G33. On the other hand, the solid-state image pickup device 35 moves away from the object side, in the course from the wide angle position to the middle position, along a trajectory 39 concave to the object side.

In the course from the middle position to the telephoto position (see FIG. 4C), the movable magnification-varying lens group G32 further moves along the zooming trajectory 32, and, at the telephoto position, the movable lens group G32 is infinitesimally close, on the optical axis 33, to the 3rd lens group G33, whereby the image angle becomes minimum. On the other hand, the solid-state image pickup device 33 moves closer to the object side, in the course from the middle position to the telephoto position, along the trajectory 39 concave to the object side.

As explained above, the present invention allows the solid-state image pickup device 35 to follow (along the trajectory 39) the focus position of the object image, movable by the movement of the movable magnification-varying lens group G32 along the zooming trajectory 32. Such focus position following mechanism for the solid-state image pickup device can be utilized not only for compensating the image plane movement resulting from variation in the image angle of the image taking device, but also for compensating the focus point movement in the focusing operation. The load to the driving device is significantly alleviated and a prompt focusing operation is made possible, since the solid-state image pickup device to be moved is light and small.

Also in case the focusing operation becomes too long because of the excessively large amount of movement required for the solid-state image pickup device, it is also possible to move the solid-state image pickup device by a predetermined amount and to move the focus correcting lens group in such a manner that the focus position coincides with the position of the image pickup device. Stated differently, the focus position following mechanism of the present invention for the solid-state image pickup device may be combined with the compensation of the image position by the movement of the focus correcting lens group.

In the following there will be explained, with reference to the attached drawings, examples of the phototaking zoom lens for the variable-magnification image taking device of the present invention.

Figure 5:
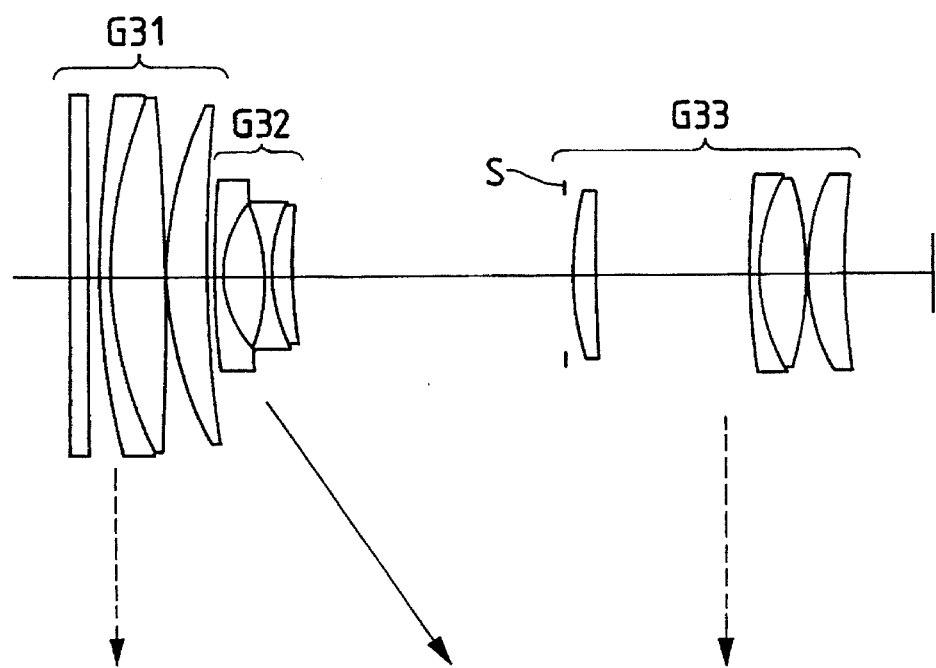
FIG. 5 is a view showing an example of the zoom lens adapted for use in the 3rd embodiment of the variable-magnification image taking device of the present invention.

FIG. 5 shows the configuration of a zoom lens for use in the third embodiment of the variable-magnification image taking device of the present invention. The illustrated zoom lens is provided, in the order from the object side, with a 1st lens group G31 consisting of a protective plate glass, an adhered lens composed of a negative meniscus lens convex to the object side and a positive biconvex lens, and a positive meniscus lens convex to the object side; a 2nd lens group G32 consisting of an adhered lens composed of a negative meniscus lens convex to the object side, a positive biconvex lens, a negative biconcave lens and a positive meniscus lens convex to the object side; and a 3rd lens group G33 consisting of a positive meniscus lens convex to the object side, an adhered lens composed of a negative meniscus lens convex to the object side and a biconvex lens, and a positive meniscus lens convex to the object side.

Between the 2nd and 3rd lens groups G32, G33 there is provided a diaphragm S.

FIG. 5 shows the positions of the lens groups in the wide angle position, and, in the magnification-varying operation to the telephoto position, the 2nd lens group G32 axially moves along the zooming trajectory indicated by an arrow, while the 1st and 3rd lens groups G31, G33 remain fixed during said operation.

Following Table 1 shows the parameters of an embodiment of the zoom lens, in which F stands for the focal length $f_{NO}$ for the f-number and $2\omega$ for the image angle. The numbers at the left-hand end indicate the order of lens faces from the object side. Also r stands for the radius of curvature of each lens face, d stands for the distance of lens faces, and n and ν respectively stand for the refractive index and the Abbe's number for d-line ($\lambda$=587.6 nm).

Between the last lens face of the phototaking lens and the image plane there are provided parallel-faced flat plates such as filters and color-separating prisms, and the parameters of such optical elements are also shown as these optical elements are included in the correction of aberrations.

The aspherical face is represented by the following equation (a):

$$S(y) = (y^2/R)/[1 + (1 - k \cdot y^2/R^2)^{1/2}] + C_2 \cdot y^2 + \quad (a)$$
$$C_4 \cdot y^4 + C_6 \cdot y^6 + C_8 \cdot y^8 + C_{10} \cdot y^{10} + \ldots$$

wherein y is the height in a direction perpendicular to the optical axis, S(y) is the amount of axial displacement at the height y, R is the reference radius of curvature, k is the conical coefficient and Cn is the aspherical coefficient of n-th order.

Also the paraxial radius r of curvature of the aspherical face is defined by the following equation (b):

$$r = 1/(2 \cdot C_2 + 1/R) \quad (b)$$

In the following tables, the aspherical face is indicated by an asterisk (*) attached to the lens face number.

TABLE 1

F = 9–54
$f_{NO}$ = 1.2–1.4
$2\omega$ = 8.64°–50.18°

| | r | d | ν | n |
|---|---|---|---|---|
| 1 | ∞ | 2.00 | 64.1 | 1.51680 |
| 2 | ∞ | 1.20 | | |
| 3 | 107.845 | 1.20 | 25.5 | 1.80518 |
| 4 | 47.074 | 6.40 | 61.2 | 1.58913 |
| 5 | −188.866 | 0.10 | | |
| 6 | 38.088 | 4.80 | 61.2 | 1.58913 |
| 7 | 136.008 | (d7 = variable) | | |
| 8 | 100.778 | 0.90 | 59.0 | 1.51823 |
| 9 | 12.260 | 4.80 | | |
| 10 | −18.533 | 0.90 | 59.0 | 1.51823 |
| 11 | 17.361 | 2.90 | 25.5 | 1.80518 |
| 12 | 56.921 | (d12 = variable) | | |
| 13 | 31.227 | 2.40 | 55.5 | 1.69680 |
| *14 | 173.563 | 1.50 | | |
| 15 | ∞ | 17.15 | (diaphragm) | |
| 16 | 58.520 | 1.00 | 23.8 | 1.84666 |
| 17 | 17.814 | 5.50 | 55.5 | 1.69680 |
| 18 | −38.236 | 0.50 | | |
| 19 | 21.100 | 4.60 | 61.2 | 1.58913 |
| 20 | 95.948 | 7.07 | | |
| 21 | ∞ | 1.35 | 70.7 | 1.54440 |
| 22 | ∞ | 1.65 | 64.1 | 1.51680 |

TABLE 1-continued

| | | | | |
|---|---|---|---|---|
| 23 | ∞ | 0.52 | 70.7 | 1.54440 |
| 24 | ∞ | 2.64 | 70.7 | 1.54440 |
| 25 | ∞ | (d25 = variable) | | |

(variable distances at zooming)

| F | 9 | 20 | 54 |
|---|---|---|---|
| d7 | 0.9697 | 17.0142 | 29.8075 |
| d12 | 33.1909 | 17.1462 | 4.3530 |
| d25 | 6.1778 | 8.0713 | 6.1778 |

(aspherical data)

| | k | $C_2$ | $C_4$ |
|---|---|---|---|
| the fourteenth surface | 1.0000 | 0.0000 | $0.14002 \times 10^{-4}$ |

| $C_6$ | $C_8$ | $C_{10}$ |
|---|---|---|
| $0.22939 \times 10^{-7}$ | $0.86929 \times 10^{-11}$ | $0.90143 \times 10^{-13}$ |

Figure 6:
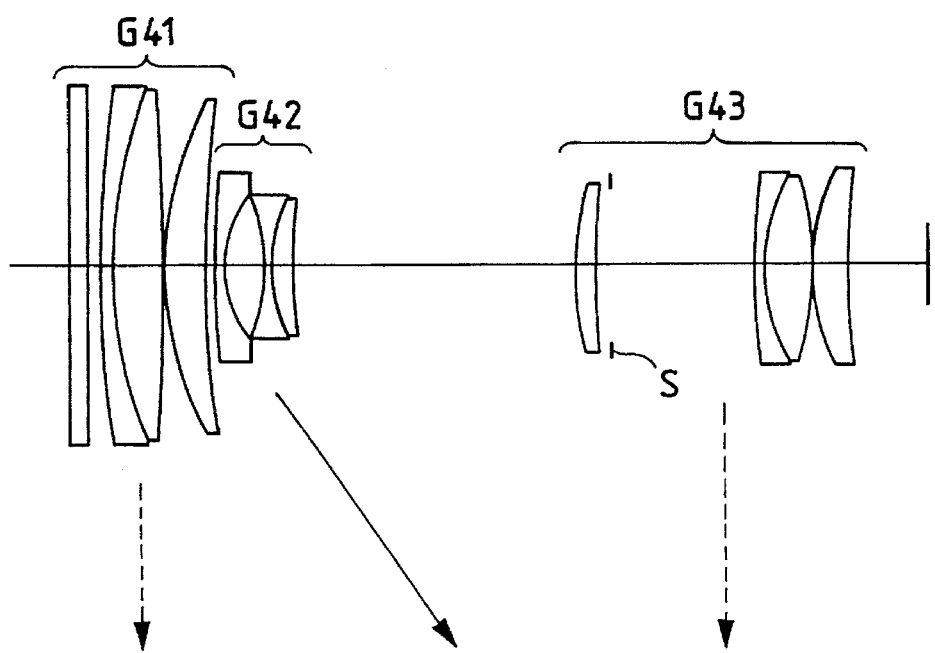
FIG. 6 is a view showing another example of the zoom lens adapted for use in the third embodiment of the variable-magnification image taking device of the present invention.

FIG. 6 shows another configuration of the zoom lens for use in the third embodiment of the variable-magnification image taking device of the present invention. The illustrated zoom lens is provided, in the order from the object side, with a 1st lens group G41 consisting of a protective glass plate, an adhered lens composed of a negative meniscus lens convex to the object side and a positive biconvex lens, and a positive meniscus lens convex to the object side; a 2nd lens group G42 consisting of an adhered lens composed of a negative meniscus lens convex to the object side, a positive biconvex lens, a negative biconcave lens and a positive meniscus lens convex to the object side; and a 3rd lens group G43 consisting of a positive meniscus lens convex to the object side, an adhered lens composed of a negative meniscus lens convex to the object side and a biconvex lens, and a positive meniscus lens convex to the object side.

Within the 3rd lens group G43, a diaphragm S is provided as illustrated.

FIG. 6 shows the positions of the lens groups in the wide angle position, and, in the magnification-varying operation toward the telephoto position, the 2nd lens group G43 axially moves along a zooming trajectory indicated by an arrow, while the 1st and 3rd lens groups G41, G43 remain fixed during said operation.

The present zoom lens is same as the above-explained zoom lens in the basic structure, but is different in the form of respective lenses.

Following Table 2 shows the parameters of the present zoom lens, in which F stands for the focal length, $f_{NO}$ for the f-number and $2\omega$ for the image angle. The numbers at the left-hand end indicate the order of lens faces from the object side. Also r stands for the radius of curvature of each lens face, d stands for the distance of lens faces, and n and ν respectively stand for the refractive index and the Abbe's number for d-line ($\lambda$=587.6 nm).

Between the last lens face of the phototaking lens and the image plane there are provided parallel-faced flat plates such as filters and color-separating prisms, and the parameters of such optical elements are also shown as these optical elements are included in the correction of aberrations.

TABLE 2

F = 9–54
$f_{NO}$ = 1.2–1.4
$2\omega$ = 8.65°–50.20°

| | r | d | v | n |
|---|---|---|---|---|
| 1 | ∞ | 2.00 | 64.1 | 1.51680 |
| 2 | ∞ | 1.20 | | |
| 3 | 97.063 | 1.20 | 25.5 | 1.80518 |
| 4 | 44.552 | 6.40 | 61.2 | 1.58913 |
| 5 | –275.607 | 0.10 | | |
| 6 | 38.822 | 4.80 | 61.2 | 1.58913 |
| 7 | 166.352 | (d7 = variable) | | |
| 8 | 83.499 | 0.90 | 59.0 | 1.51823 |
| 9 | 11.832 | 4.80 | | |
| 10 | –18.036 | 0.90 | 59.0 | 1.51823 |
| 11 | 17.008 | 2.30 | 25.5 | 1.80518 |
| 12 | 60.144 | (d12 = variable) | | |
| 13 | ∞ | 1.00 | (diaphragm) | |
| *14 | 35.664 | 2.40 | 55.5 | 1.69680 |
| 15 | 609.371 | 18.60 | | |
| 16 | 71.502 | 1.00 | 23.8 | 1.84666 |
| 17 | 18.904 | 5.50 | 55.5 | 1.69680 |
| 18 | –35.958 | 0.50 | | |
| 19 | 21.410 | 4.60 | 61.2 | 1.58913 |
| 20 | 122.026 | 7.33 | | |
| 21 | ∞ | 1.35 | 70.7 | 1.54440 |
| 22 | ∞ | 1.65 | 64.1 | 1.51680 |
| 23 | ∞ | 0.52 | 70.7 | 1.54440 |
| 24 | ∞ | 2.64 | 70.7 | 1.54440 |
| 25 | ∞ | (d25 = variable) | | |

(variable distances at zooming)

| F | 9 | 20 | 54 |
|---|---|---|---|
| d7 | 0.9714 | 16.2961 | 37.2398 |
| d12 | 31.9197 | 16.5950 | 3.0818 |
| d25 | 6.1778 | 8.0071 | 6.1778 |

(aspherical data)

| | k | $C_2$ | $C_4$ |
|---|---|---|---|
| the fourteenth surface | 1.0000 | 0.0000 | $0.13093 \times 10^{-4}$ |

| $C_6$ | $C_8$ | $C_{10}$ |
|---|---|---|
| $0.28894 \times 10^{-7}$ | $0.19152 \times 10^{-10}$ | $-0.22545 \times 10^{-12}$ |

As explained in the foregoing, the present invention is provided with the focus position following mechanism for the solid-state image pickup device and the compensation mechanism for the image vibration. Consequently, the movable correcting lens can be dispensed with by driving the solid-state image pickup device to the focus position instead of driving the conventional movable correcting lens to compensate the displacement of the image point due to zooming, and the limitation in designing can be significantly alleviated. There can thus be provided a simplified lens structure, and a variable-magnification image taking device of high performance, without the image vibration.

Besides the compensation for zooming operation can be achieved by the movement of the light and small solid-state image pickup device, so that the load to the driving device can be reduced and a prompt focusing operation is made possible.

Furthermore, the elimination of the correcting lens group reduces the number of lens elements required for correction of aberrations, so that the entire phototaking lens can be compactized.

As explained in the foregoing, the present invention dispenses with the correcting lens group, thereby providing a compact variable-magnification image taking device, which achieves high performance in a simpler structure.

What is claimed is:

1. A variable-magnification image taking device comprising:

a phototaking lens in which magnification is varied by zooming;

a solid-state image taking device which receives an object image formed by said phototaking lens and stores image information thereof;

a moving device which moves said solid-state image taking device along an optical axis; and a control unit which receives information as to magnification variation of said phototaking lens and which controls said moving device according to the magnification variation of said phototaking lens, so as to compensate displacement of an image point of the object image which moves with zooming of said phototaking lens.

2. A device according to claim 1, wherein said solid-state image taking device is an area image sensor.

3. A device according to claim 2, wherein said phototaking lens is provided, in the order from the object side, with a first lens group of a positive refractive power, a second lens group of a negative refractive power and a third lens group of a positive refractive power, wherein at least one of said first to third lens groups is axially movable for varying the magnification from the wide angle end to the telephoto end.

4. A device according to claim 3, wherein said second lens group is moved toward said solid-state image pickup device to vary the magnification from the wide angle end to the telephoto end, while said first and third lens groups are fixed.

5. A device according to claim 4, wherein at least one of plural lenses constituting said second lens group has an Abbe's number for d-line larger than 40.

6. A device according to claim 3, wherein at least one of the surfaces of plural lenses constituting said first to third lens groups is an aspherical face.

7. A device according to claim 6, wherein at least one of the surfaces of plural lenses constituting said third lens group is an aspherical face.

8. A device according to claim 1, further comprising:

a compensation circuit which compensates vibration of an image plane which is due to vibration of said solid-state image taking device which is caused by movement of said solid-state image taking device along the optical axis by said moving device.

9. A variable-magnification image taking device comprising:

a phototaking lens without a compensating lens, said phototaking lens having a movable magnification-varying lens group which varies magnification by zooming;

a sensor which detects an amount of movement of said movable magnification-varying lens group and produces a corresponding output;

a solid-state image taking device which receives an object image formed by said phototaking lens and stores image information thereof;

a moving device which moves said solid-state image taking device along an optical axis; and a control unit which responds to said output of said sensor and which controls said moving device according to an amount of movement of said movable magnification-varying lens group, so as to compensate displacement of an image point of the object image which moves with zooming of said phototaking lens.

* * * * *